(12) United States Patent
Zhang et al.

(10) Patent No.: US 12,455,876 B2
(45) Date of Patent: Oct. 28, 2025

(54) REQUEST IDENTIFICATION METHOD AND APPARATUS, DEVICE, AND STORAGE MEDIUM

(71) Applicant: Beijing Bytedance Network Technology Co., Ltd., Beijing (CN)

(72) Inventors: Bo Zhang, Beijing (CN); Yuren Zhang, Beijing (CN); Meng Xie, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/283,603

(22) PCT Filed: Mar. 21, 2022

(86) PCT No.: PCT/CN2022/082033
§ 371 (c)(1),
(2) Date: Sep. 22, 2023

(87) PCT Pub. No.: WO2022/222665
PCT Pub. Date: Oct. 27, 2022

(65) Prior Publication Data
US 2024/0111759 A1    Apr. 4, 2024

(30) Foreign Application Priority Data
Apr. 20, 2021    (CN) .......................... 202110422507.6

(51) Int. Cl.
*G06F 16/23*    (2019.01)
*G06F 11/34*    (2006.01)
*G06F 16/22*    (2019.01)

(52) U.S. Cl.
CPC ...... *G06F 16/2386* (2019.01); *G06F 11/3419* (2013.01); *G06F 16/2246* (2019.01)

(58) Field of Classification Search
CPC ............ G06F 16/2322; G06F 16/2386; G06F 16/2246; G06F 16/2465
(Continued)

(56) References Cited

U.S. PATENT DOCUMENTS

| 10,382,461 B1* | 8/2019 | Sharifi Mehr ...... H04L 63/1425 |
| 2020/0099710 A1* | 3/2020 | Wu .......................... H04L 63/10 |
| 2022/0067011 A1* | 3/2022 | Yue ......................... G06F 16/248 |

FOREIGN PATENT DOCUMENTS

| CN | 104917643 | * | 9/2015 | ............. H04L 12/26 |
| CN | 104917643 A | * | 9/2015 | ............. H04L 12/26 |

(Continued)

OTHER PUBLICATIONS

International Search Report in PCT/CN2022/082033, mailed Jun. 8, 2022, 5 pages.
(Continued)

*Primary Examiner* — Shahid A Alam
(74) *Attorney, Agent, or Firm* — Astute IP Law Group

(57) ABSTRACT

The present disclosure provides a request identification method and apparatus, a device, and a storage medium. The method includes: obtaining a to-be-identified access request and a frequent item set for identifying an abnormal request, the frequent item set including a target client feature obtained based on mining of historical request data, a quantity of historical request data corresponding to the target client feature being greater than a predetermined frequent threshold, and the frequent item set being an item set that passes a request timestamp distribution abnormality detection; matching client information carried in the to-be-identified access request with the target client feature included in the frequent item set to obtain a matching result; and determining, when the matching result indicates a successful match, the to-be-identified access request as an abnormal
(Continued)

S101 — Obtaining a to-be-identified access request and a frequent item set for identifying an abnormal request S102 — Matching client information carried in the to-be-identified access request with the target client feature included in the frequent item set to obtain a matching result S103 — Determining, when the matching result indicates a successful match, the to-be-identified access request as an abnormal request request. The abnormal request is identified based on the pre-generated frequent item set for identifying the abnormal request.

18 Claims, 4 Drawing Sheets

(58) Field of Classification Search
USPC .......................................................... 707/609
See application file for complete search history.

(56) References Cited

FOREIGN PATENT DOCUMENTS

| | | |
|---|---|---|
| CN | 106850632 A | 6/2017 |
| CN | 110209551 A | 9/2019 |
| CN | 110516170 A | 11/2019 |
| CN | 110944007 A | 3/2020 |
| CN | 111224936 A | 6/2020 |
| CN | 111507734 A | 8/2020 |
| CN | 112003819 A | 11/2020 |
| CN | 112463913 A | 3/2021 |

OTHER PUBLICATIONS

First Office Action received for Chinese Patent Application No. 202110422507.6, mailed on Jun. 26, 2025, 16 pages (8 pages of English Translation and 8 pages of Original document).

* cited by examiner

REQUEST IDENTIFICATION METHOD AND APPARATUS, DEVICE, AND STORAGE MEDIUM

PRIORITY INFORMATION

The present application is a 35 U.S.C. § 371 National Phase of International Patent Application No. PCT/CN2022/082033, titled "REQUEST IDENTIFICATION METHOD AND APPARATUS, DEVICE, AND STORAGE MEDIUM," and filed Mar. 21, 2022, which claims a priority to Chinese Patent Application No. 202110422507.6, titled "REQUEST IDENTIFICATION METHOD AND APPARATUS, DEVICE, AND STORAGE MEDIUM" and filed on Apr. 20, 2021, the entire contents of which are incorporated herein by reference.

FIELD

The present disclosure relates to the field of data processing, and more particularly, to a request identification method and apparatus, a device, and a storage medium.

BACKGROUND

With the development of mobile Internet, more and more multimedia contents are uploaded to the Internet for users to access. Meanwhile, a phenomenon of crawling multimedia contents has become increasingly severe. Batch crawling the multimedia contents is a growing practice. In particular, large quantities of multimedia contents are obtained by transmitting batch requests. The practice of batch crawling the multimedia contents seriously endangers the health of an Internet platform.

For this reason, it is an urgent technical problem to be solved regarding how to identify an abnormal request for batch crawling to reduce an impact of the abnormal request on the Internet platform.

SUMMARY

To solve the above technical problems or at least partially solve the above technical problems, the present disclosure provides a request identification method and apparatus, a device, and a storage medium, capable of identifying an abnormal request based on a pre-generated frequent item set for identifying the abnormal request, to reduce an impact of the abnormal request such as batch crawling on an Internet platform.

In a first aspect, the present disclosure provides a request identification method. The method includes: obtaining a to-be-identified access request and a frequent item set for identifying an abnormal request, the frequent item set includes a target client feature obtained based on mining of historical request data, a quantity of historical request data corresponding to the target client feature is greater than a predetermined frequent threshold, and the frequent item set is an item set that passes a request timestamp distribution abnormality detection; matching client information carried in the to-be-identified access request with the target client feature included in the frequent item set to obtain a matching result; and determining, when the matching result indicates a successful match, the to-be-identified access request as an abnormal request.

In an embodiment, the method further includes, prior to the obtaining the to-be-identified access request and the frequent item set for identifying the abnormal request: storing, using a tree structure, client information carried in historical request data within a predetermined time period to obtain a feature tree, a node in the feature tree corresponding to at least one client feature in the client information, the node is configured to store a quantity of historical request data carrying the at least one client feature corresponding to the node; generating at least one frequent item set based on the feature tree, the at least one frequent item set includes a target client feature determined from client features, and the quantity of historical request data corresponding to the target client feature is greater than the predetermined frequent threshold; and determining the at least one frequent item set as the frequent item set for identifying the abnormal request.

In an embodiment, the historical request data further includes a request timestamp, the node is further configured to store a request timestamp distribution vector of historical request data corresponding to the node, and the request timestamp distribution vector is configured to reflect a request time distribution of the historical request data corresponding to the node. The method further includes, subsequent to the generating the at least one frequent item set based on the feature tree: determining, based on the request timestamp distribution vector stored at the node in the feature tree, a request timestamp distribution vector corresponding to historical request data carrying a target client feature in a first frequent item set, the first frequent item set belongs to the at least one frequent item set; and performing the request timestamp distribution abnormality detection on the first frequent item set based on the request timestamp distribution vector.

In an embodiment, the performing the request timestamp distribution abnormality detection on the first frequent item set based on the request timestamp distribution vector includes: calculating a difference value between the request timestamp distribution vector and a standard request timestamp distribution vector; and deleting, when the difference value is smaller than a first predetermined difference threshold, the first frequent item set from the at least one frequent item set.

In an embodiment, the historical request data further includes a request interface identifier, the node is further configured to store a request interface distribution vector of historical request data corresponding to the node, and the request interface distribution vector is configured to reflect a request interface distribution of the historical request data corresponding to the node. The method further includes, subsequent to the generating the at least one frequent item set based on the feature tree: determining, based on the request interface distribution vector stored at the node in the feature tree, a request interface distribution vector corresponding to historical request data carrying a target client feature in a second frequent item set, the second frequent item set belongs to the at least one frequent item set; and performing, based on the request interface distribution vector, a request interface distribution abnormality detection on the second frequent item set.

In an embodiment, the performing, based on the request interface distribution vector, the request interface distribution abnormality detection on the second frequent item set includes: calculating a difference value between the request interface distribution vector and a standard request interface distribution vector; and deleting, when the difference value is smaller than a second predetermined difference threshold, the second frequent item set from the at least one frequent item set.

In an embodiment, the historical request data further includes a user quality identifier, the node is further configured to store a user quality identifier set of historical request data corresponding to the node. The method further includes, subsequent to the generating the at least one frequent item set based on the feature tree: determining, based on a user quality identifier set stored at the node in the feature tree, a user quality identifier set corresponding to historical request data carrying a target client feature in a third frequent item set, the third frequent item set belongs to the at least one frequent item set; and deleting, when the user quality identifier set satisfies a predetermined user quality condition, the third frequent item set from the at least one frequent item set.

In an embodiment, the method further includes, prior to the storing, using the tree structure, the client information carried in the historical request data within the predetermined time period to obtain the feature tree: determining client features included in the client information carried in the historical request data within the predetermined time period; determining, from the historical request data within the predetermined time period, a quantity of historical request data carrying each of the client features; and deleting, when the quantity of historical request data carrying the client feature is smaller than a predetermined threshold, the client feature from the historical request data within the predetermined time period.

In an embodiment, the method further includes, subsequent to the deleting, when the quantity of historical request data carrying any client feature is smaller than the predetermined threshold, the client feature from the historical request data within the predetermined time period: setting value identifiers for client features in the historical request data within the predetermined time period, to obtain a correspondence between the client features and the value identifiers; and replacing, based on the correspondence between the client features and the value identifiers, each client feature in the historical request data with the value identifiers corresponding to the client features.

In an embodiment, the storing, using the tree structure, the client information carried in the historical request data within the predetermined time period to obtain the feature tree includes: storing, using a frequency pattern tree structure, the client information carried in the historical request data within the predetermined time period to obtain a frequency pattern tree. The generating the at least one frequent item set based on the feature tree includes: generating, using a frequent pattern growth algorithm, the at least one frequent item set based on the frequency pattern tree.

In a second aspect, the present disclosure provides a request identification apparatus. The apparatus includes: a first obtaining module configured to obtain a to-be-identified access request and a frequent item set for identifying an abnormal request, the frequent item set includes a target client feature obtained based on mining of historical request data, a quantity of historical request data corresponding to the target client feature is greater than a predetermined frequent threshold, and the frequent item set is an item set that passes a request timestamp distribution abnormality detection; a matching module configured to match client information carried in the to-be-identified access request with the target client feature included in the frequent item set to obtain a matching result; and a first determining module configured to determine, when the matching result indicates a successful match, the to-be-identified access request as an abnormal request.

In a third aspect, the present disclosure provides a computer-readable storage medium. The computer-readable storage medium stores instructions. The instructions, when executed on a terminal device, cause the terminal device to implement the above-mentioned method.

In a fourth aspect, the present disclosure provides a device. The device includes a memory, a processor, and a computer program stored in the memory and executable on the processor. The processor, when executing the computer program, implements the above-mentioned method.

In a fifth aspect, the present disclosure provides a computer program product. The computer program product includes computer programs or instructions. The computer program/instructions, when executed by a processor, implement the above-mentioned method.

The technical solutions provided by embodiments of the present disclosure have the following advantages over the related art.

The embodiments of the present disclosure provide the request identification method. The to-be-identified access request and the frequent item set for identifying the abnormal request are obtained. The frequent item set includes the target client feature obtained based on the mining of the historical request data. The quantity of the historical request data corresponding to the target client feature is greater than the predetermined frequent threshold. The frequent item set is the item set that passes the request timestamp distribution abnormality detection. The client information carried in the to-be-identified access request is matched with the target client feature included in the frequent item set to obtain the matching result. The to-be-identified access request is determined as the abnormal request when the matching result indicates the successful match. According to the embodiments of the present disclosure, the abnormal request is identified based on the pre-generated frequent item set for identifying the abnormal request, thereby reducing the impact of the abnormal request on the Internet platform.

In addition, since the frequent item set can more comprehensively reflect a combination of various client features of the abnormal request, identifying the abnormal request based on the frequent item set can yield a more accurate identification result, which further reduces the impact of the abnormal request such as the batch crawling on the Internet platform.

BRIEF DESCRIPTION OF THE DRAWINGS

Accompanying drawings herein are incorporated in and form part of the specification, illustrate embodiments consistent with the present disclosure, and are used in conjunction with the specification to explain principles of the present disclosure.

In order to clearly explain technical solutions of the embodiments of the present disclosure or in the related art, drawings used in the description of the embodiments or the related art are briefly described below. Based on these drawings, other drawings can be obtained by those skilled in the art without creative effort.

DETAILED DESCRIPTION

To enable a clearer understanding of the above objects, features, and advantages of the present disclosure, solutions of the present disclosure will be further described below. It should be noted that embodiments of the present disclosure and the features in the embodiments can be combined with each other without conflict.

Exemplary details are set forth in the following description to facilitate a full understanding of the present disclosure, but the present disclosure can also be implemented in other ways than those described herein. The embodiments in the specification are only part, rather than all, of the embodiments of the present disclosure.

A batch crawling request is used to crawl multimedia contents on the Internet. Since the batch crawling request seriously endangers the health of an Internet platform, reducing abnormal requests such as batch crawling through a request identification method is an effective measure to reduce an impact of the abnormal requests on the Internet platform.

To this end, the embodiments of the present disclosure provide a request identification method. A to-be-identified access request and a frequent item set for identifying an abnormal request are obtained. The frequent item set includes a target client feature obtained based on mining of historical request data. A quantity of historical request data corresponding to the target client feature is greater than a predetermined frequent threshold. The frequent item set is an item set that passes a request timestamp distribution abnormality detection. Client information carried in the to-be-identified access request is matched with the target client feature included in the frequent item set to obtain a matching result. The to-be-identified access request is determined as an abnormal request when the matching result indicates a successful match. According to the embodiments of the present disclosure, the abnormal request is identified based on the pre-generated frequent item set for identifying the abnormal request, thereby reducing an impact of the abnormal request on an Internet platform.

Figure 1:
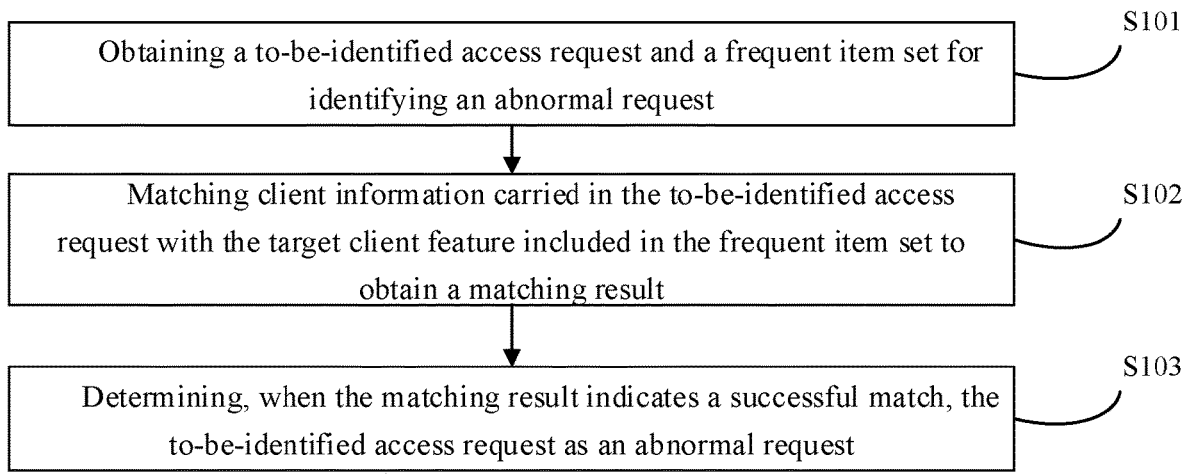
FIG. 1 is a flowchart of a request identification method according to an embodiment of the present disclosure.

On this basis, the embodiments of the present disclosure provide a request identification method. FIG. 1 is a flowchart of a request identification method according to an embodiment of the present disclosure. As illustrated in FIG. 1, the method includes operations at blocks.

At S101, a to-be-identified access request and a frequent item set for identifying an abnormal request are obtained.

The frequent item set includes a target client feature obtained based on mining of historical request data. A quantity of historical request data corresponding to the target client feature is greater than a predetermined frequent threshold. The frequent item set is an item set that passes a request timestamp distribution abnormality detection.

In the embodiments of the present disclosure, the frequent item set for identifying the abnormal request is pre-generated based on the historical request data. The frequent item set includes the target client feature obtained based on the mining of the historical request data. For example, the target client feature may include "user identifier=123456", "software version number=1.0", and "software download channel=official website".

Since the abnormal request usually has a client-related characteristic, for example, the batch crawling requests are usually transmitted by several clients having fixed IP addresses, the embodiments of the present disclosure may form, based on the target client feature obtained based on mining of client information in the historical request data, the frequent item set used for identifying the abnormal request.

In addition, an item set may be referred to as the frequent item set, when the quantity of the historical request data corresponding to the target client feature included in the frequent item set is greater than the predetermined frequent threshold. Usually, the predetermined frequent threshold may be set based on an order of magnitude of the historical request data.

A method for generating the frequent item set for identifying the abnormal request will be described in detail later in the present disclosure, and details thereof will be omitted herein.

At S102, client information carried in the to-be-identified access request is matched with the target client feature included in the frequent item set to obtain a matching result.

In the embodiments of the present disclosure, the client information carried in the to-be-identified access request is obtained after obtaining of the to-be-identified access request and the frequent item set. The client information is matched with the target client feature included in the frequent item set to obtain the matching result.

In an embodiment, when the client information carried in the to-be-identified request includes the target client feature, the client information is determined as being successfully matched with the target client feature, otherwise the client information is determined as failing to be matched with the target client feature.

At S103, the to-be-identified access request is determined as an abnormal request when the matching result indicates a successful match.

In the embodiments of the present disclosure, when the client information carried in the to-be-identified access request is determined as being successfully matched with the target client feature, the to-be-identified access request is determined as the abnormal request.

With the request identification method provided in the embodiments of the present disclosure, the to-be-identified access request and the frequent item set for identifying the abnormal request are obtained. The frequent item set includes the target client feature obtained based on the mining of the historical request data. The quantity of the historical request data corresponding to the target client feature is greater than the predetermined frequent threshold. The frequent item set is the item set that passes the request timestamp distribution abnormality detection. The client information carried in the to-be-identified access request is matched with the target client feature included in the frequent item set to obtain the matching result. The to-be-identified access request is determined as the abnormal request when the matching result indicates the successful match. According to the embodiments of the present disclosure, the abnormal request is identified based on the pre-generated frequent item set for identifying the abnormal request, thereby reducing the impact of the abnormal request on the Internet platform.

Figure 2:
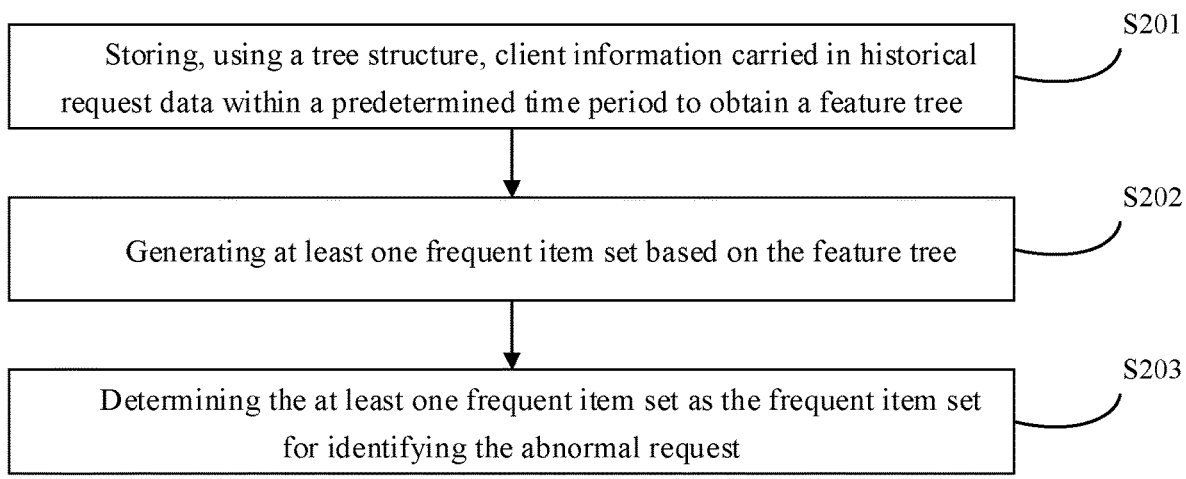
FIG. 2 is a flowchart of a method for generating a frequent item set according to an embodiment of the present disclosure.

In practice, the frequent item set for identifying the abnormal request is pre-generated based on the historical request data, prior to a request identification based on the frequent item set. In some embodiments, based on the above embodiments, the embodiments of the present disclosure provide the method for generating the frequent item set. FIG. 2 is a flowchart of a method for generating a frequent item set according to an embodiment of the present disclosure. As illustrated in FIG. 2, the method includes operations to blocks.

At S201, client information carried in historical request data within a predetermined time period is stored using a tree structure to obtain a feature tree.

A node in the feature tree corresponds to at least one client feature in the client information. The node is configured to store a quantity of historical request data carrying the at least one client feature corresponding to the node.

In the embodiments of the present disclosure, a plurality of pieces of historical request data within the predetermined time period is obtained. The historical request data carries the client information. In some embodiments, the client information refers to information of a client that transmits an access request corresponding to the historical request data, and may include client software information and client hardware information. The client software information may include a user identifier, a software version number, a software download channel, etc. For example, client information in a piece of historical request data may include: user identifier=123456, software version number=1.0, and software download channel=official website. The client hardware information may include a device identifier, a device operating system version number, a device type, a network type, etc. For example, the client information in the piece of historical request data may further include: device identifier=1.2.0.4, device operating system version number=8.0, device type=smartphone, and network type=public network.

Assuming that a piece of historical request data in the embodiments of the present disclosure includes {user identifier=123456, software version number=1.0, software download channel=official website, device identifier=1.2.0.4, device operating system version number=8.0, device type=smartphone, network type=public network}, the client information in the historical request data may characterize features of the client that transmits the access request corresponding to the historical request data.

In practice, the predetermined time period may be a continuous period, such as one hour, etc. By caching the access requests within the predetermined time period, and parsing the client information from the access requests within the predetermined time period, historical request data of the corresponding access requests is formed based on the parsed client information or the like, and is used to generate the frequent item set for identifying the abnormal request.

In the embodiments of the present disclosure, the client information in the historical request data within the predetermined time period is added to the tree structure one by one after obtaining of the historical request data, which realizes storing, using the tree structure, the client information in the historical request data to obtain the feature tree. The node in the feature tree corresponds to the at least one client feature in the client information, and is configured to store the quantity of the historical request data carrying the at least one client feature corresponding to the node.

In an embodiment, the client information carried in the historical request data may be stored using a frequent pattern tree (FPTree) structure to obtain a frequent pattern tree (FPTree). At least one frequent item set is generated, using a frequent pattern growth (FPGrowth) algorithm, based on the FPTree.

Figure 3:
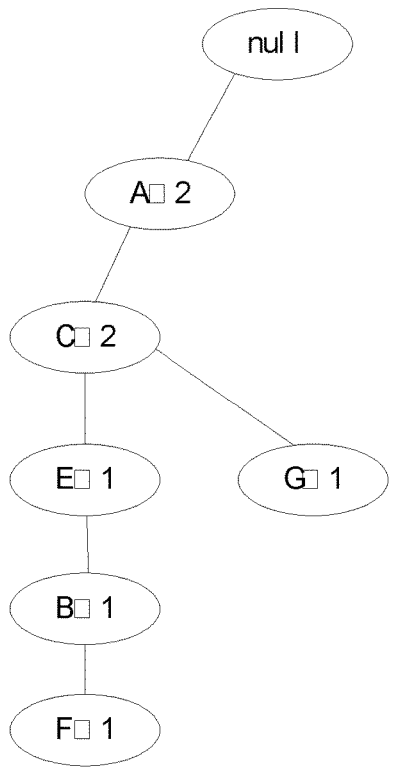
FIG. 3 is a schematic diagram showing part of a structure of a frequent pattern tree (FPTree) according to an embodiment of the present disclosure.

FIG. 3 is a schematic diagram showing part of a structure of a frequent pattern tree (FPTree) according to an embodiment of the present disclosure. As illustrated in FIG. 3, a vertex of the FPTree is null. For the sake of simplifying the figure, A is used to denote the user identifier=123456, C is used to denote the software version number=1.0, E is used to denote the software download channel=official website, B is used to denote the device identifier=1.2.0.4, F is used to denote the device operating system version number=8.0, and G is used to denote the software download channel=application store.

For historical request data {user identifier=123456, software version number=1.0, software download channel=official website, device identifier=1.2.0.4, device operating system version number=8.0}, the client features are added to the FPTree structure in turn as a node of the FPTree structure, and a count of a corresponding node is incremented by 1, which indicates that a quantity of historical request data having the client feature corresponding to the node is increased by 1. For historical request data {user identifier=123456, software version number=1.0, G representing software download channel=application store}, the client features are added to the FPTree structure in turn. When a node corresponding to the client feature is available, a count of the node is incremented by 1, otherwise a node is added for the client feature. For example, as illustrated in FIG. 3, a node "G:1" is added for the client feature "software download channel=application store".

All the client features in the client information carried in the historical request data are added to the FPTree structure in accordance with the above method to obtain a FPTree storing the historical request data within the predetermined time period. The node in the FPTree corresponds to the at least one client feature. In the FPTree, client features corresponding to nodes on a same path belong to a same piece of historical request data. Each node in the FPTree is configured to store a quantity of historical request data carrying at least one client feature corresponding to the node.

At S202, at least one frequent item set is generated based on the feature tree.

The at least one frequent item set includes a target client feature determined from client features. The quantity of historical request data corresponding to the target client feature is greater than the predetermined frequent threshold.

In the embodiments of the present disclosure, the at least one frequent item set may be generated, using the frequent pattern growth (FPGrowth) algorithm, based on the FPTree after obtaining of the feature tree corresponding to the historical request data. The at least one frequent item set includes the target client feature determined from the client features of the historical request data. The quantity of the historical request data corresponding to the target client feature is greater than the predetermined frequent threshold. Usually, a plurality of frequent item sets is generated.

The FPGrowth algorithm is a frequent item set mining algorithm that uses FPTree as a data structure on which the algorithm relies, which achieves mining of the frequent item set through a distributed computing system.

Take FIG. 3 as an example, it is assumed that a count corresponding to a node A is eight, a count corresponding to a node C is eight, a count corresponding to a node E is six, a count corresponding to a node B is two, and a count corresponding to a node F is two. For each node, one or more frequent item sets corresponding to the node may be generated. For example, frequent item sets corresponding to the node F that have the quantity of historical request data greater than the predetermined frequent threshold (e.g., one) may include a plurality of frequent item sets such as {A:2, F:2}, {C:2, F:2}, {E:2, F:2}, {B:2, F:2}, and {A:2, C:2, F:2} corresponding to the quantity of historical request data greater than the predetermined frequent threshold.

It should be noted that, the count of each node in FIG. 3 is for illustration only. In practice, during generation of the frequent item set mined from big data, a magnitude of counts of each node and a magnitude of the predetermined frequent threshold are usually large. For example, the predetermined frequent threshold may be 10,000 when the historical request data is cached data accumulated in one hour. That is, determination of the predetermined frequent threshold is related to a length of the predetermined time period. With an increase of the predetermined time period, a data volume of the accumulated cached historical request data becomes larger, and accordingly the predetermined frequent threshold is set to be greater, and vice versa.

In the embodiments of the present disclosure, an exemplary implementation of generating, using the FPGrowth algorithm, the frequent item set based on FPTree will not be described in detail.

At S203, the at least one frequent item set is determined as the frequent item set for identifying the abnormal request.

In the embodiments of the present disclosure, after generation of the at least one frequent item set, each of the at least one frequent item set is determined as the frequent item set for identifying the abnormal request, to identify the abnormal request such as the batch crawling.

With the method for generating the frequent item set provided by the embodiments of the present disclosure, the frequent item set is generated based on the client information carried in the historical request data, and is used to identify a request. Since the frequent item set can more comprehensively reflect a combination of various client features of the abnormal request, identifying the abnormal request based on the frequent item set can yield a more accurate identification result, which further reduces the impact of the abnormal request such as the batch crawling on the Internet platform.

In practice, to reduce a volume of data stored in the tree structure without affecting accuracy of the generated frequent item set for identifying the abnormal request, according to the embodiments of the present disclosure, the client feature whose quantity of historical request data corresponding to the client feature is smaller than a predetermined threshold is deleted from each piece of historical request data to reduce the data volume of the historical request data.

In some embodiments, client features included in the client information carried in the historical request data within the predetermined time period are determined. A quantity of historical request data carrying each of the client features is respectively determined from the historical request data within the predetermined time period. When the quantity of historical request data carrying any client feature is smaller than a predetermined threshold, the client feature is deleted from the historical request data within the predetermined time period.

In an embodiment, client features in different historical request data within the predetermined time period are grouped. For example, user identifier features in the different historical request data may all be grouped into a user identifier feature group. A similar grouping method is applied in grouping of each of a software version number feature group, a software download channel feature group, a device operating system version number feature group, or the like. Request quantities of historical request data corresponding to different feature values are counted in feature groups.

As an example, for a device operating system version number (os_version) feature group, it is assumed that the os_version feature group includes: Count(os_version=100) =10,000, Count(os_version=200)=15,000 and Count(os_version=300)=10,000, which means that there are 10,000 pieces of historical request data carrying os_version=100, 15,000 pieces of historical request data carrying os_version=200, and 10,000 pieces of historical request data carrying os_version=300.

In the feature group, different feature values are sorted in a descending order based on request quantities of historical request data corresponding to the different feature values. Since the historical request data has a great quantity and the corresponding feature values have a higher possibility of being abnormal, according to the embodiments of the present disclosure, a feature value having a quantity smaller than or equal to the predetermined threshold may be removed. That is, only a feature value having a quantity greater than the predetermined threshold is retained, thereby reducing the data volume of the historical request data subsequently used to generate the frequent item set.

In addition, to further reduce the data volume of the historical request data used to generate the frequent item set, on a basis of the above-mentioned embodiments, the embodiments of the present disclosure may also replace the feature value retained in the historical request data with a character of a relatively small data volume.

In some embodiments, a value identifier is respectively set for each of feature values, belonging to a same client feature, in the historical request data, and a correspondence between feature values belonging to corresponding client features and value identifiers is obtained. A feature value in the historical request data is replaced, based on the correspondence between the feature values and the value identifiers, with a value identifier corresponding to the feature value.

In an optional embodiment, the feature values sorted in the descending order based on the request quantities of historical request data corresponding to the feature values are subject to data bucketing. For example, the above-mentioned os_version feature group is divided into two buckets. A bucket numbered 0 corresponds to os_version=200, while a bucket numbered 1 corresponds to os_version=100 and os_version=300. Numbers of the buckets are used as value identifiers of corresponding feature values to establish the correspondence between the feature values and the value identifiers.

After obtaining of the correspondence between the feature values and the value identifiers in each feature group, the feature value, in the client feature, in each piece of historical request data is replaced, based on the correspondence, with the value identifier corresponding to the feature value. For example, the replaced historical request data may be {user identifier=123456, software version number=1, software download channel=1, device identifier=1, device operating system version number=0, device type=1, network type=1}.

It should be noted that, since the user identifier takes a wide range of values, it is inapplicable to reduce the data volume of the user identifier by the above-mentioned method. Thus, the feature value corresponding to the user identifier in each piece of historical request data may be retained.

To improve accuracy of request identification, on a basis of the above-mentioned embodiments, according to the embodiments of the present disclosure, after generation of the at least one frequent item set based on the feature tree, a verification may be performed on the at least one frequent item set to remove a frequent item set that fails the verification and retain a frequent item set that passes the verification. The request identification is performed based on the frequent item set that passes the verification to improve the accuracy of the request identification.

Figure 4:
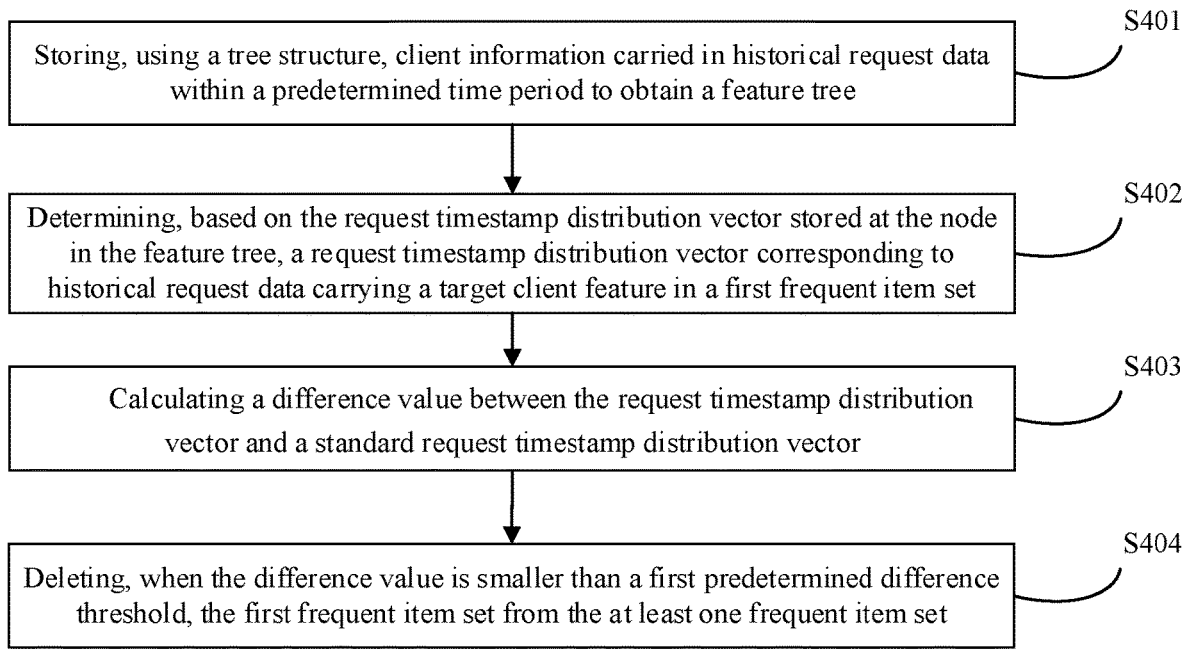
FIG. 4 is a flowchart of another method for generating a frequent item set according to an embodiment of the present disclosure.

In an embodiment, a request timestamp distribution abnormality detection may be performed on each frequent item set based on a request timestamp distribution. FIG. 4 is a flowchart of another method for generating a frequent item set according to an embodiment of the present disclosure. As illustrated in FIG. 4, the method includes operations at blocks.

At S401, client information carried in historical request data within a predetermined time period is stored using a tree structure to obtain a feature tree.

A node in the feature tree corresponds to at least one client feature in the client information. The node is configured to store a quantity of historical request data carrying the at least one client feature corresponding to the node.

The operation at S401 in the embodiment of the present disclosure is implemented in a same manner as that at S201 in the above embodiments, and can be interpreted with reference to the description of S201 in the above embodiments, details thereof will be therefore omitted herein.

At S402, a request timestamp distribution vector corresponding to historical request data carrying a target client feature in a first frequent item set is determined, based on the request timestamp distribution vector stored at the node in the feature tree. The first frequent item set belongs to the at least one frequent item set.

In the embodiments of the present disclosure, a request timestamp is a time point when the access request corresponding to the historical request data is transmitted from the client to a server, i.e., a reception time point for the access request recorded by the server. The request timestamp is used to reflect one of server features of a corresponding access request.

In the embodiments of the present disclosure, when timestamp distribution features in the historical request data is stored one by one using the tree structure, a request timestamp in each piece of historical request data may form the request timestamp distribution vector with request timestamps of historical request data belonging to a same node. The request timestamp distribution vector is configured to reflect a request time distribution of the historical request data corresponding to the node.

For example, for the node C in FIG. 3 representing the client feature software version number=1.0, a request timestamp distribution vector corresponding to the node C is configured to represent a distribution of request reception time points corresponding to access requests carrying the client feature software version number=1.0. Since request transmission time points of the abnormal requests such as the batch crawling usually present a distribution feature, e.g., the abnormal requests are transmitted in batches at several time points, the request time distribution may reflect a feature of this type of abnormal requests.

In an embodiment, the predetermined time period may be evenly divided into a plurality of time periods. For example, if the predetermined time period is one hour, every ten minutes may be divided as one time period, and thus the predetermined time period is divided into a total of six time periods. Therefore, a request timestamp distribution vector corresponding to each node is a 6-dimensional vector. A quantity of pieces of historical request data corresponding to each time period is recorded by each dimension in turn, which can reflect a request time distribution of the historical request data, within the predetermined time period, carrying a timestamp distribution feature corresponding to the node.

In the embodiments of the present disclosure, after generation of the at least one frequent item set, for each frequent item set, a request timestamp distribution vector corresponding to the frequent item set is determined. The request timestamp distribution vector is configured to characterize a distribution of historical request data carrying the feature value in the frequent item set in a temporal dimension. The request timestamp distribution abnormality detection is performed on the frequent item set based on the request timestamp distribution vector.

At S403, a difference value between the request timestamp distribution vector and a standard request timestamp distribution vector is calculated.

In the embodiments of the present disclosure, the standard request timestamp distribution vector is predetermined. In some embodiments, a timestamp distribution of normal requests (non-cheating requests) over a time period may be pre-collected to obtain the standard request timestamp distribution vector. The standard request timestamp distribution vector is configured to reflect timestamp distribution requests of normal requests.

It should be understood that, with a decrease in a difference between the request timestamp distribution vector and the standard request timestamp distribution vector, a similarity between distributions of the request timestamp distribution vector and the standard request timestamp distribution vector increases, and a probability that a timestamp distribution feature in the frequent item set corresponding to the request timestamp distribution vector belongs to an abnormal request feature decreases, and vice versa.

Therefore, the difference value between the request timestamp distribution vector and the standard request timestamp distribution vector may be calculated. Whether the frequent item set corresponding to the request timestamp distribution vector can reflect a feature of the abnormal request is determined based on the difference value.

In practice, a difference in each of variances, maximum values, or minimum values may be used as the difference value.

In an embodiment, a variance of each of the request timestamp distribution vector and the standard request timestamp distribution vector may be calculated. A difference in the variances of the request timestamp distribution vector and the standard request timestamp distribution vector may be calculated, and used as the difference value between the request timestamp distribution vector and the standard request timestamp distribution vector.

In another embodiment, a maximum value or a minimum value of each of the request timestamp distribution vector and the standard request timestamp distribution vector may be calculated. A difference between the maximum value of the request timestamp distribution vector and the maximum value of standard request timestamp distribution vector and a difference between the minimum value of the request timestamp distribution vector and the minimum value of the standard request timestamp distribution vector may be calculated and are used as the difference value between the request timestamp distribution vector and the standard request timestamp distribution vector.

At S404, the first frequent item set is deleted, when the difference value is smaller than a first predetermined difference threshold, from the at least one frequent item set.

In the embodiments of the present disclosure, after determination of the difference value between the request timestamp distribution vector and the standard request timestamp distribution vector, whether the difference value is smaller than the first predetermined difference threshold is determined. When the difference value is smaller than the first predetermined difference threshold, a difference between the request timestamp distribution vector and the standard request timestamp distribution vector is little, which indicates that the timestamp distribution feature in the frequent item set corresponding to the request timestamp distribution vector is incapable of reflecting the feature of the abnormal request. Thus, the frequent item set may be removed. Otherwise, the frequent item set is retained for the request identification.

In the embodiments of the present disclosure, when the difference value between the request timestamp distribution vector corresponding to the first frequent item set and the standard request timestamp distribution vector is smaller than the first predetermined difference threshold, the first frequent item set may be deleted from the at least one frequent item set.

With the method for generating the frequent item set provided by the embodiments of the present disclosure, a verification is performed on the at least one frequent item set from a request time distribution dimension to remove the frequent item set that fails the verification and retain the frequent item set that passes the verification. The request identification is performed based on the frequent item set that passes the verification to improve the accuracy of the request identification.

Figure 5:
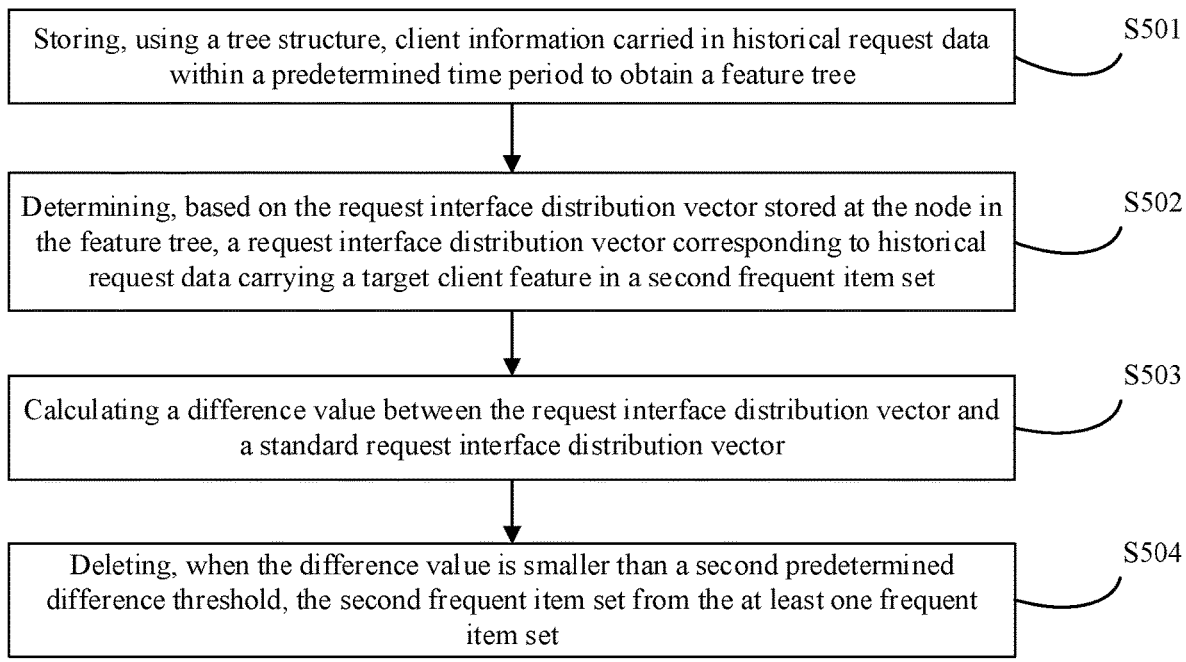
FIG. 5 is a flowchart of yet another method for generating a frequent item set according to an embodiment of the present disclosure.

In another embodiment, since a distribution of server interfaces corresponding to access requests can also reflect a feature of the access requests over a period, the verification may further be performed on each frequent item set based on the distribution of the server interfaces. FIG. 5 is a flowchart of yet another method for generating a frequent item set according to an embodiment of the present disclosure. As illustrated in FIG. 5, the method includes operations at blocks.

At S501, client information carried in historical request data within a predetermined time period is stored using a tree structure to obtain a feature tree.

A node in the feature tree corresponds to at least one client feature in the client information. The node is configured to store a quantity of historical request data carrying the at least one client feature corresponding to the node.

The operation at S501 in the embodiment of the present disclosure is implemented in a same manner as that at S201 in the above embodiments, and can be interpreted with reference to the description of S201 in the above embodiments, details thereof will be therefore omitted herein.

At S502, a request interface distribution vector corresponding to historical request data carrying a target client feature in a second frequent item set is determined, based on the request interface distribution vector stored at the node in the feature tree.

The second frequent item set belongs to the at least one frequent item set.

In the embodiments of the present disclosure, the historical request data further includes a request interface identifier. The node in the feature tree is further configured to store a request interface distribution vector of historical request data corresponding to the node. The request interface distribution vector is configured to reflect a request interface distribution of the historical request data corresponding to the node. The request interface identifier is configured to uniquely identify an interface that receives the access request corresponding to the historical request data, i.e., an interface identifier recorded by the server for receiving the access request. The request interface identifier is configured to characterize one of server features of a corresponding access request.

In the embodiments of the present disclosure, when client features in the historical request data is stored one by one using the tree structure, a request interface identifier in each piece of historical request data may form the request interface distribution vector with request interface identifiers of historical request data belonging to a same node. The request interface distribution vector is configured to reflect a request interface distribution of the historical request data corresponding to the node.

For example, for the node C in FIG. 3 representing the feature value software version number=1.0, a request interface distribution vector corresponding to the node C is configured to represent a distribution of request receiving interfaces corresponding to access requests carrying the feature value software version number=1.0. Since request reception interfaces of abnormal requests such as the batch crawling usually present a distribution feature, e.g., the abnormal requests are transmitted in batches on several interfaces, the request interface distribution may reflect a feature of the abnormal requests.

In an embodiment, a distribution of request interface identifiers in the historical request data corresponding to the node may be collected, and a corresponding request interface distribution vector may be obtained. Dimensions of the request interface distribution vector correspond to the request interface identifiers. Each dimension is configured to record a quantity of a corresponding request interface identifier, and can reflect an interface distribution of access requests, in the historical request data within the predetermined time period, carrying an interface distribution feature corresponding to the node.

In the embodiments of the present disclosure, for each frequent item set, the request interface identifier in the historical request data corresponding to the client feature included in the frequent item set is determined, and the request interface distribution vector configured to reflect the request interface distribution is formed. The request interface distribution vector is represented as a marginal distribution. It should be noted that, for a frequent item set having n feature values, n request interface distribution vectors may be determined.

In an embodiment, subsequent to the generation of the at least one frequent item set based on the feature tree according to the embodiments of the present disclosure, a verification may be performed on the at least one frequent item set from a request time dimension in accordance with the method in the above embodiments, and each frequent item set that passes the verification is determined as a basis for a verification from an interface distribution dimension according to the embodiments of the present disclosure, to verify each frequent item set from different dimensions, which allows a more accurate frequent item set to be obtained based on the frequent item set passing verifications from different dimensions, thereby improving the accuracy of the request identification performed based on the frequent item set.

In the embodiments of the present disclosure, the second frequent item set may be any frequent item set generated based on the historical request data. A request interface distribution abnormality detection is performed, based on the request interface distribution vector corresponding to the second frequent item set, on the second frequent item set, to determine whether the second frequent item set passes the verification from the interface distribution dimension.

At S503, a difference value between the request interface distribution vector and a standard request interface distribution vector is calculated.

In the embodiments of the present disclosure, the standard request interface distribution vector is predetermined. In some embodiments, a request interface distribution of normal requests over a time period may be pre-collected to obtain the standard request interface distribution vector. The standard request interface distribution vector is configured to reflect an interface distribution of normal requests. Usually, the standard request interface distribution vector is a joint distribution.

In practice, after determination of a request interface distribution vector corresponding to each of n feature values in the frequent item set, a difference value between the request interface distribution vector and the standard request interface distribution vector is calculated. In some embodiments, a divergence value $JS\_j$ may be used to represent a difference value between a request interface distribution vector corresponding to a j-th feature value and the standard request interface distribution vector. With an increase in the divergence value $JS\_j$, a distribution difference between the request interface distribution vector and the standard request interface distribution vector increases.

At S504, when the difference value is smaller than a second predetermined difference threshold, the second frequent item set is deleted from the at least one frequent item set.

In the embodiments of the present disclosure, after obtaining of the scatter values $JS\_j$ corresponding to the n feature values in the frequent item set, a quantity k of $JS\_j$ greater than a predetermined $JS\_min$ is counted. If $k<k\_min$, it means that the interface distribution feature in this frequent item set is incapable of characterizing the feature of the abnormal request, and the second frequent item set may be therefore removed. Otherwise, the second frequent item set is retained for the request identification. Both $JS\_min$ and $k\_min$ belong to the second predetermined difference threshold.

With the method for generating the frequent item set provided by the embodiments of the present disclosure, a verification is performed on the at least one frequent item set from the interface distribution dimension to remove the frequent item set that fails the verification and retain the frequent item set that passes the verification. The request identification is performed based on the frequent item set that passes the verification to improve the accuracy of the request identification.

In addition, a quality of a user corresponding to the access request may also reflect whether the access request is the abnormal request. For example, a high-quality user for the server usually does not belong to users who transmit the abnormal requests. Therefore, according to the embodiments of the present disclosure, a verification may be further performed on the frequent item set from a user quality dimension.

In the embodiments of the present disclosure, the historical request data may further include a user quality identifier. The user quality identifier may be configured to identify whether the user corresponding to the access request is the high-quality user.

In the embodiments of the present disclosure, the node of the feature tree is further configured to store a user quality identifier set of historical request data corresponding to the node. The user quality identifier set may reflect a quantity of high-quality users or the like.

In the embodiments of the present disclosure, when the client features in the historical request data is stored one by one using the tree structure, a user quality identifier in each piece of historical request data and user quality identifiers of historical request data belonging to a same node may form a user quality identifier set of the node.

In an embodiment, the user quality identifier identifying the high-quality user in the historical request data belonging to the same node may be added to the user quality identifier set of the node.

In the embodiments of the present disclosure, for each frequent item set, the user quality identifier of the high-quality user in the historical request data carrying the target client feature in the frequent item set may be determined as an element in the user quality identifier set corresponding to the frequent item set.

In the embodiments of the present disclosure, a user quality identifier set corresponding to historical request data carrying a target client feature in a third frequent item set is determined, based on a user quality identifier set stored at the node in the feature tree. The third frequent item set belongs to the at least one frequent item set. When the user quality identifier set satisfies a predetermined user quality condition, the third frequent item set is deleted from the at least one frequent item set.

In the embodiments of the present disclosure, the predetermined user quality condition may be that the quantity of high-quality users is greater than a predetermined value, such as greater than 1.

In some embodiments, after determination of the user quality identifier set corresponding to each frequent item set, whether high-quality users in a quantity greater than the predetermined value present in the user quality identifier set is determined. When the high-quality users in the quantity greater than the predetermined value present in the user quality identifier set, it means that the feature value in the frequent item set is incapable of reflecting the feature of the abnormal request, and the frequent item set may be therefore removed. Otherwise, the frequent item set is retained for the request identification.

According to the embodiments of the present disclosure, a verification is performed on the at least one frequent item set from a user quality dimension to remove the frequent item set that fails the verification and retain the frequent item set that passes the verification. The request identification is performed based on the frequent item set that passes the verification to improve the accuracy of the request identification.

In an implementation, according to the embodiments of the present disclosure, a verification may be performed, in combination with the above-mentioned methods for verifying the frequent item set, on the at least one frequent item set from the request time distribution dimension, the interface distribution dimension, and the user quality dimension, to remove the frequent item set that fails the verification and retain the frequent item set that passes the verification. The request identification is performed based on the frequent item set that passes the verification to improve the accuracy of the request identification.

Figure 6:
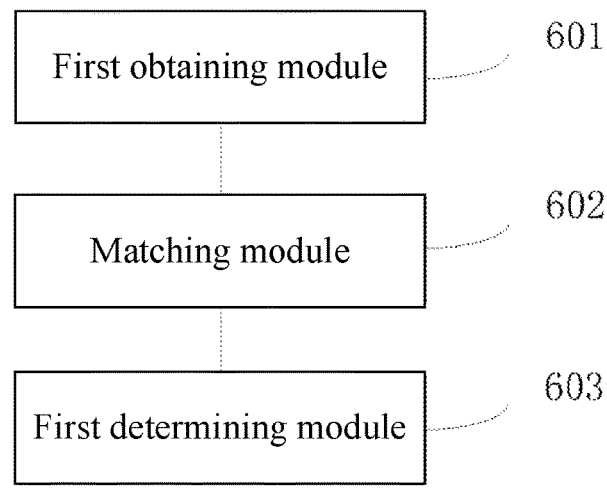
FIG. 6 is a schematic diagram showing a structure of a request identification apparatus according to an embodiment of the present disclosure.

Based on the same concept as that of the above-mentioned method embodiments, the present disclosure further provides a request identification apparatus. FIG. 6 is a schematic diagram showing a structure of a request identification apparatus according to an embodiment of the present disclosure. As illustrated in FIG. 6, the apparatus includes a first obtaining module 601, a matching module 602, and a first determining module 603.

The first obtaining module 601 is configured to obtain a to-be-identified access request and a frequent item set for identifying an abnormal request. The frequent item set includes a target client feature obtained based on mining of historical request data. A quantity of historical request data corresponding to the target client feature is greater than a predetermined frequent threshold. The frequent item set is an item set that passes a request timestamp distribution abnormality detection.

The matching module 602 is configured to match client information carried in the to-be-identified access request with the target client feature included in the frequent item set to obtain a matching result.

The first determining module 603 is configured to determine, when the matching result indicates a successful match, the to-be-identified access request as an abnormal request.

In an embodiment, the apparatus further includes a first storage module, a first generation module, and a second determining module.

The first storage module is configured to store, using a tree structure, client information carried in historical request data within a predetermined time period to obtain a feature tree. A node in the feature tree corresponds to at least one client feature in the client information. The node is configured to store a quantity of historical request data carrying the at least one client feature corresponding to the node.

The first generation module is configured to generate at least one frequent item set based on the feature tree. The at least one frequent item set includes a target client feature determined from client features. The quantity of historical request data corresponding to the target client feature is greater than the predetermined frequent threshold.

The second determining module is configured to determine the at least one frequent item set as the frequent item set for identifying the abnormal request.

In an embodiment, the historical request data further includes a request timestamp. The node is further configured to store a request timestamp distribution vector of historical request data corresponding to the node. The request timestamp distribution vector is configured to reflect a request time distribution of the historical request data corresponding to the node. The apparatus further includes a third determining module and a first detection module.

The third determining module is configured to determine, based on the request timestamp distribution vector stored at the node in the feature tree, a request timestamp distribution vector corresponding to historical request data carrying a target client feature in a first frequent item set. The first frequent item set belongs to the at least one frequent item set.

The first detection module is configured to perform the request timestamp distribution abnormality detection on the first frequent item set based on the request timestamp distribution vector.

In an embodiment, the first detection module includes a first calculation sub-module and a first deletion sub-module.

The first calculation sub-module is configured to calculate a difference value between the request timestamp distribution vector and a standard request timestamp distribution vector.

The first deletion sub-module is configured to delete, when the difference value is smaller than a first predetermined difference threshold, the first frequent item set from the at least one frequent item set.

In an embodiment, the historical request data further includes a request interface identifier. The node is further configured to store a request interface distribution vector of historical request data corresponding to the node. The request interface distribution vector is configured to reflect a request interface distribution of the historical request data corresponding to the node. The apparatus further includes a fourth determining module and a second detection module.

The fourth determining module is configured to determine, based on the request interface distribution vector stored at the node in the feature tree, a request interface distribution vector corresponding to historical request data carrying a target client feature in a second frequent item set. The second frequent item set belongs to the at least one frequent item set.

The second detection module is configured to perform, based on the request interface distribution vector, a request interface distribution abnormality detection on the second frequent item set.

In an embodiment, the second detection module includes a second calculation sub-module and a second deletion sub-module.

The second calculation sub-module is configured to calculate a difference value between the request interface distribution vector and a standard request interface distribution vector.

The second deletion sub-module is configured to delete, when the difference value is smaller than a second predetermined difference threshold, the second frequent item set from the at least one frequent item set.

In an embodiment, the historical request data further includes a user quality identifier. The node is further configured to store a user quality identifier set of historical request data corresponding to the node. The apparatus further includes a fifth determining module and a third deletion sub-module.

The fifth determining module is configured to determine, based on a user quality identifier set stored at the node in the feature tree, a user quality identifier set corresponding to historical request data carrying a target client feature in a third frequent item set. The third frequent item set belongs to the at least one frequent item set.

The third deletion sub-module is configured to delete, when the user quality identifier set satisfies a predetermined user quality condition, the third frequent item set from the at least one frequent item set.

In an embodiment, the apparatus further includes a sixth determining module, a seventh determining module, and a first deletion module.

The sixth determining module is configured to determine client features included in the client information carried in the historical request data within the predetermined time period.

The seventh determining module is configured to respectively determine, from the historical request data within the predetermined time period, a quantity of historical request data carrying each of the client features.

The first deletion module is configured to delete, when the quantity of historical request data carrying any client feature is smaller than a predetermined threshold, the client feature from the historical request data within the predetermined time period.

In an embodiment, the apparatus further includes a first setting module and a replacement module.

The first setting module is configured to respectively set, within the predetermined time period, a value identifier for each of feature values, belonging to a same client feature, in the historical request data, and obtain a correspondence between feature values belonging to client features and value identifiers.

The replacement module is configured to replace, based on the correspondence between the feature values belonging to the client features and the value identifiers, a feature value, belonging to each of the client features, in the historical request data with a value identifier corresponding to the feature value.

In an embodiment, the first storage module is exemplary configured to store, using a frequency pattern tree structure, the client information carried in the historical request data within the predetermined time period to obtain a frequency pattern tree.

Correspondingly, the first generation module is exemplary configured to generate, using a frequent pattern growth algorithm, the at least one frequent item set based on the frequency pattern tree.

With the request identification apparatus provided in the embodiments of the present disclosure, the to-be-identified access request and the frequent item set for identifying the abnormal request are obtained. The frequent item set includes the target client feature obtained based on the mining of the historical request data. The quantity of the historical request data corresponding to the target client feature is greater than the predetermined frequent threshold. The frequent item set is the item set that passes the request timestamp distribution abnormality detection. The client information carried in the to-be-identified access request is matched with the target client feature included in the frequent item set to obtain the matching result. The to-be-identified access request is determined as the abnormal request when the matching result indicates the successful match. According to the embodiments of the present disclosure, the abnormal request is identified based on the pre-generated frequent item set for identifying the abnormal request, thereby reducing the impact of the abnormal request on the Internet platform.

In addition, since the frequent item set can more comprehensively reflect a combination of various features of the abnormal request, the request identification based on the frequent item set can yield a more accurate identification result, which further reduces the impact of the abnormal request such as the batch crawling on the Internet platform.

In addition to the method and apparatus described above, the embodiments of the present disclosure further provide a computer-readable storage medium. The computer-readable storage medium stores instructions. The instructions, when executed on a terminal device, cause the terminal device to implement the request identification method according to the embodiments of the present disclosure.

The embodiments of the present disclosure further provide a computer program product including computer programs or instructions. The computer programs or the instructions, when executed by a processor, implement the request identification method according to the embodiments of the present disclosure.

Figure 7:
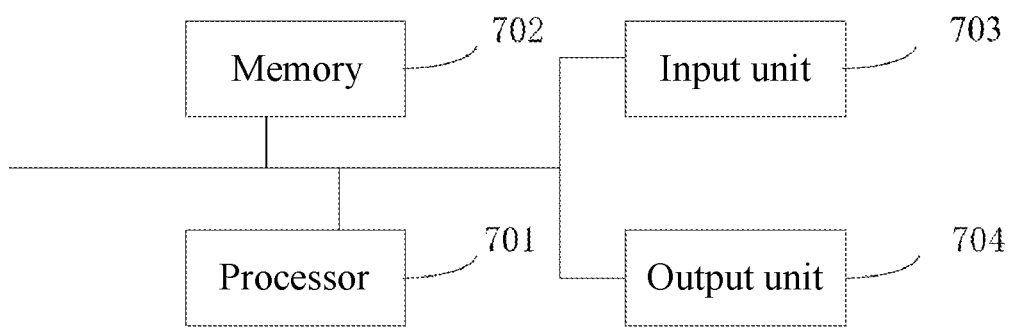
FIG. 7 is a schematic diagram showing a structure of a request identification device according to an embodiment of the present disclosure.

In addition, the embodiments of the present disclosure further provide a request identification device. As illustrated in FIG. 7, the request identification device can include a processor 701, a memory 702, an input unit 703, and an output unit 704.

One or more processors 701 may be provided in the request identification device. As an example, one processor is provided in FIG. 7. In some embodiments of the processor, the processor 701, the memory 702, the input unit 703, and the output unit 704 may be connected to each other via a bus or in other manners. FIG. 7 is illustrated by establishing the connection via the bus.

The memory 702 can be configured to store computer programs and modules. The processor 701 is configured to perform various functional applications and data processing of the request identification device by executing the computer programs and modules that are stored in the memory 702. The memory 702 may primarily include a program storage region and a data storage region. An operating system, a computer program required for at least one function, or the like may be stored in the program storage region. In addition, the memory 702 may include a cache random access memory, and may further include a non-volatile memory, such as at least one magnetic disk memory, a flash memory device, or other non-volatile solid-state memory devices. The input unit 703 can be configured to receive input numeric or character information and generate signal inputs related to user settings and function control of the request identification device.

In the embodiment, the processor 701 is configured to load an executable file corresponding to processes of one or more computer programs into the memory 702 in accordance with the following instructions, and execute the computer programs stored in the memory 702, to achieve various functions of the request identification device described above.

It should be noted that relational terms herein, such as "first" and "second", are used only for differentiating one entity or operation from another entity or operation, which, however do not necessarily require or imply that there should be any real relationship or sequence between the entities or operations. Also, terms "comprise", "include" or any other variations thereof are meant to cover non-exclusive inclusions, such that the process, method, article, or device including a series of elements do not only include those elements, but also include other elements that are not explicitly listed, or also include inherent elements of the process, method, article, or device. In a case that there are no more restrictions, an element qualified by the statement "comprises a . . . " does not exclude the presence of additional identical elements in the process, method, article, or device that includes the said element.

Exemplary embodiments of the present disclosure are described above to enable those skilled in the art to understand or implement the present disclosure. A variety of modifications to these embodiments will be apparent to those skilled in the art. The general principles defined herein may be implemented in other embodiments without departing from the spirit or scope of the present disclosure. Accordingly, the present disclosure is not limited to these embodiments described herein, but is to be accorded the broadest scope consistent with the principles and novel features disclosed herein.

What is claimed is:

1. A request identification method, applied in an Internet platform and comprising:
obtaining, by the Internet platform, a to-be-identified access request and a frequent item set for identifying an abnormal request, the frequent item set comprising a target client feature obtained based on mining of historical request data, a quantity of historical request data corresponding to the target client feature being greater than a predetermined frequent threshold, and the frequent item set being an item set that passes a request timestamp distribution abnormality detection;

matching, by the Internet platform, client information carried in the to-be-identified access request with the target client feature comprised in the frequent item set to obtain a matching result; and determining, by the Internet platform when the matching result indicates a successful match, the to-be-identified access request as an abnormal request, reducing an impact of the abnormal request on the Internet platform, wherein the method further comprises, prior to said obtaining the to-be-identified access request and the frequent item set for identifying the abnormal request:

storing, using a tree structure, client information carried in historical request data within a predetermined time period to obtain a feature tree, a node in the feature tree corresponding to at least one client feature in the client information, the node being configured to store a quantity of historical request data carrying the at least one client feature corresponding to the node;

generating at least one frequent item set based on the feature tree, the at least one frequent item set comprising a target client feature determined from client features, and the quantity of historical request data corresponding to the target client feature being greater than the predetermined frequent threshold; and determining the at least one frequent item set as the frequent item set for identifying the abnormal request.

2. The method according to claim 1, wherein the historical request data further comprises a request timestamp, the node being further configured to store a request timestamp distribution vector of historical request data corresponding to the node, and the request timestamp distribution vector being configured to reflect a request time distribution of the historical request data corresponding to the node; and the method further comprises, prior to said determining the at least one frequent item set as the frequent item set for identifying the abnormal request:

determining, based on the request timestamp distribution vector stored at the node in the feature tree, a request timestamp distribution vector corresponding to historical request data carrying a target client feature in a first frequent item set, the first frequent item set belonging to the at least one frequent item set; and performing the request timestamp distribution abnormality detection on the first frequent item set based on the request timestamp distribution vector.

3. The method according to claim 2, wherein said performing the request timestamp distribution abnormality detection on the first frequent item set based on the request timestamp distribution vector comprises:

calculating a difference value between the request timestamp distribution vector and a standard request timestamp distribution vector; and deleting, when the difference value is smaller than a first predetermined difference threshold, the first frequent item set from the at least one frequent item set.

4. The method according to claim 1, wherein the historical request data further comprises a request interface identifier, the node being further configured to store a request interface distribution vector of historical request data corresponding to the node, and the request interface distribution vector being configured to reflect a request interface distribution of the historical request data corresponding to the node; and the method further comprises, prior to said determining the at least one frequent item set as the frequent item set for identifying the abnormal request:

determining, based on the request interface distribution vector stored at the node in the feature tree, a request interface distribution vector corresponding to historical request data carrying a target client feature in a second frequent item set, the second frequent item set belonging to the at least one frequent item set; and performing, based on the request interface distribution vector, a request interface distribution abnormality detection on the second frequent item set.

5. The method according to claim 4, wherein said performing, based on the request interface distribution vector, the request interface distribution abnormality detection on the second frequent item set comprises:

calculating a difference value between the request interface distribution vector and a standard request interface distribution vector, and deleting, when the difference value is smaller than a second predetermined difference threshold, the second frequent item set from the at least one frequent item set.

6. The method according to claim 1, wherein the historical request data further comprises a user quality identifier, the node being further configured to store a user quality identifier set of historical request data corresponding to the node; and the method further comprises, prior to said determining the at least one frequent item set as the frequent item set for identifying the abnormal request:

determining, based on a user quality identifier set stored at the node in the feature tree, a user quality identifier set corresponding to historical request data carrying a target client feature in a third frequent item set, the third frequent item set belonging to the at least one frequent item set; and deleting, when the user quality identifier set satisfies a predetermined user quality condition, the third frequent item set from the at least one frequent item set.

7. The method according to claim 1, further comprising, prior to said storing, using the tree structure, the client information carried in the historical request data within the predetermined time period to obtain the feature tree:

determining client features comprised in the client information carried in the historical request data within the predetermined time period;

determining, from the historical request data within the predetermined time period, a quantity of historical request data carrying each of the client features; and deleting, when the quantity of historical request data carrying any client feature is smaller than a predetermined threshold, the client feature from the historical request data within the predetermined time period.

8. The method according to claim 7, further comprising, subsequent to said deleting, when the quantity of historical request data carrying any client feature is smaller than the predetermined threshold, the client feature from the historical request data within the predetermined time period:

setting a value identifier for each feature value belonging to a same client feature in the historical request data within the predetermined time period, to obtain a correspondence between feature values belonging to client features and value identifiers; and replacing, based on the correspondence between the feature values belonging to the client features and the value identifiers, each feature value belonging to each client feature in the historical request data with a value identifier corresponding to the feature value.

9. The method according to claim 1, wherein said storing, using the tree structure, the client information carried in the historical request data within the predetermined time period to obtain the feature tree comprises:
storing, using a frequency pattern tree structure, the client information carried in the historical request data within the predetermined time period to obtain a frequency pattern tree; and
said generating the at least one frequent item set based on the feature tree comprises:
generating, using a frequent pattern growth algorithm, the at least one frequent item set based on the frequency pattern tree.

10. A non-transitory computer-readable storage medium, the computer-readable storage medium having instructions stored therein, wherein the instructions, when executed on a terminal device, cause the terminal device to implement a request identification method, comprising:
obtaining, by the terminal device, a to-be-identified access request and a frequent item set for identifying an abnormal request, the frequent item set comprising a target client feature obtained based on mining of historical request data, a quantity of historical request data corresponding to the target client feature being greater than a predetermined frequent threshold, and the frequent item set being an item set that passes a request timestamp distribution abnormality detection;
matching, by the terminal device, client information carried in the to-be-identified access request with the target client feature comprised in the frequent item set to obtain a matching result; and
determining, by the terminal device when the matching result indicates a successful match, the to-be-identified access request as an abnormal request, reducing an impact of the abnormal request on an Internet platform,
wherein the request identification method further comprises, prior to said obtaining the to-be-identified access request and the frequent item set for identifying the abnormal request:
storing, using a tree structure, client information carried in historical request data within a predetermined time period to obtain a feature tree, a node in the feature tree corresponding to at least one client feature in the client information, the node being configured to store a quantity of historical request data carrying the at least one client feature corresponding to the node;
generating at least one frequent item set based on the feature tree, the at least one frequent item set comprising a target client feature determined from client features, and the quantity of historical request data corresponding to the target client feature being greater than the predetermined frequent threshold; and
determining the at least one frequent item set as the frequent item set for identifying the abnormal request.

11. A device, comprising a memory, a processor, and a computer program stored in the memory and executable on the processor, wherein the computer program, when being executed by the processor, causing the processor to:
obtain a to-be-identified access request and a frequent item set for identifying an abnormal request, the frequent item set comprising a target client feature obtained based on mining of historical request data, a quantity of historical request data corresponding to the target client feature being greater than a predetermined frequent threshold, and the frequent item set being an item set that passes a request timestamp distribution abnormality detection;
match client information carried in the to-be-identified access request with the target client feature comprised in the frequent item set to obtain a matching result; and
determine, when the matching result indicates a successful match, the to-be-identified access request as an abnormal request, reducing an impact of the abnormal request on an Internet platform,
wherein the computer program, when being executed by the processor, further causes the processor to, prior to said obtaining the to-be-identified access request and the frequent item set for identifying the abnormal request:
store, using a tree structure, client information carried in historical request data within a predetermined time period to obtain a feature tree, a node in the feature tree corresponding to at least one client feature in the client information, the node being configured to store a quantity of historical request data carrying the at least one client feature corresponding to the node:
generate at least one frequent item set based on the feature tree, the at least one frequent item set comprising a target client feature determined from client features, and the quantity of historical request data corresponding to the target client feature being greater than the predetermined frequent threshold; and
determine the at least one frequent item set as the frequent item set for identifying the abnormal request.

12. A non-transitory computer program product, the computer program product comprising a computer program/instructions, wherein the computer program/instructions, when executed by a processor, implement the method according to claim 1.

13. The device according to claim 11, wherein the historical request data further comprises a request timestamp, the node being further configured to store a request timestamp distribution vector of historical request data corresponding to the node, and the request timestamp distribution vector being configured to reflect a request time distribution of the historical request data corresponding to the node; and
the computer program, when being executed by the processor, further causes the processor to, prior to said determining the at least one frequent item set as the frequent item set for identifying the abnormal request:
determine, based on the request timestamp distribution vector stored at the node in the feature tree, a request timestamp distribution vector corresponding to historical request data carrying a target client feature in a first frequent item set, the first frequent item set belonging to the at least one frequent item set; and
perform the request timestamp distribution abnormality detection on the first frequent item set based on the request timestamp distribution vector.

14. The device according to claim 13, wherein said performing the request timestamp distribution abnormality detection on the first frequent item set based on the request timestamp distribution vector comprises:
calculating a difference value between the request timestamp distribution vector and a standard request timestamp distribution vector; and
deleting, when the difference value is smaller than a first predetermined difference threshold, the first frequent item set from the at least one frequent item set.

15. The device according to claim 11, wherein the historical request data further comprises a request interface identifier, the node being further configured to store a request interface distribution vector of historical request data corresponding to the node, and the request interface distribution vector being configured to reflect a request interface distribution of the historical request data corresponding to the node; and the computer program, when being executed by the processor, further causes the processor to, prior to said determining the at least one frequent item set as the frequent item set for identifying the abnormal request:

determining, based on the request interface distribution vector stored at the node in the feature tree, a request interface distribution vector corresponding to historical request data carrying a target client feature in a second frequent item set, the second frequent item set belonging to the at least one frequent item set; and performing, based on the request interface distribution vector, a request interface distribution abnormality detection on the second frequent item set.

16. The device according to claim 15, wherein said performing, based on the request interface distribution vector, the request interface distribution abnormality detection on the second frequent item set comprises:

calculating a difference value between the request interface distribution vector and a standard request interface distribution vector; and deleting, when the difference value is smaller than a second predetermined difference threshold, the second frequent item set from the at least one frequent item set.

17. The device according to claim 11, wherein the historical request data further comprises a user quality identifier, the node being further configured to store a user quality identifier set of historical request data corresponding to the node; and the computer program, when being executed by the processor, further causes the processor to, prior to said determining the at least one frequent item set as the frequent item set for identifying the abnormal request:

determine, based on a user quality identifier set stored at the node in the feature tree, a user quality identifier set corresponding to historical request data carrying a target client feature in a third frequent item set, the third frequent item set belonging to the at least one frequent item set; and delete, when the user quality identifier set satisfies a predetermined user quality condition, the third frequent item set from the at least one frequent item set.

18. The device according to claim 11, wherein the computer program, when being executed by the processor, further causes the processor to, prior to said storing, using the tree structure, the client information carried in the historical request data within the predetermined time period to obtain the feature tree:

determine client features comprised in the client information carried in the historical request data within the predetermined time period;

determine, from the historical request data within the predetermined time period, a quantity of historical request data carrying each of the client features; and delete, when the quantity of historical request data carrying any client feature is smaller than a predetermined threshold, the client feature from the historical request data within the predetermined time period.

\* \* \* \* \*